(12) United States Patent
Hamm-Dubischar

(10) Patent No.: US 9,151,437 B2
(45) Date of Patent: Oct. 6, 2015

(54) STAND STRUCTURE

(75) Inventor: Christian Hamm-Dubischar, Bremerhaven (DE)

(73) Assignee: ALFRED-WEGENER-INSTITUT HELMHOLTZ-ZENTRUM FUER POLAR-UND MEERESFORSCHUNG, Bremerhaven (DE)

( * ) Notice: Subject to any disclaimer, the term of this patent is extended or adjusted under 35 U.S.C. 154(b) by 259 days.

(21) Appl. No.: 13/641,712

(22) PCT Filed: Feb. 25, 2011

(86) PCT No.: PCT/DE2011/000227
§ 371 (c)(1),
(2), (4) Date: Dec. 19, 2012

(87) PCT Pub. No.: WO2011/131160
PCT Pub. Date: Oct. 27, 2011

(65) Prior Publication Data
US 2013/0193284 A1    Aug. 1, 2013

(30) Foreign Application Priority Data
Apr. 18, 2010  (DE) .......................... 10 2010 015 761

(51) Int. Cl.
*F16M 11/00* (2006.01)
*F03D 11/04* (2006.01)

(52) U.S. Cl.
CPC .............. *F16M 11/00* (2013.01); *F03D 11/04* (2013.01); *F03D 11/045* (2013.01);
(Continued)

(58) Field of Classification Search
CPC ..... F03D 11/04; F03D 11/045; F03D 1/0608; F16M 11/00; Y02E 10/721; Y02E 10/722; Y02E 10/727; Y02E 10/728

USPC .......... 248/163.1, 127, 128, 146, 163.2, 431, 248/176.1, 440
See application file for complete search history.

(56) References Cited

U.S. PATENT DOCUMENTS 1,517,825 A * 12/1924 Bruneau ........................ 248/171
1,894,695 A *  1/1933 Ley ............................... 248/171
(Continued)

FOREIGN PATENT DOCUMENTS

DE        3509721 A1    3/1986
DE       10014426 A1   10/2001
(Continued)

OTHER PUBLICATIONS

European Patent Office, International Search Report in International Patent Application No. PCT/DE2011/000227 (Jul. 30, 2012).

*Primary Examiner* — Todd M Epps
(74) *Attorney, Agent, or Firm* — Leydig, Voit & Mayer, Ltd.

(57) ABSTRACT

A stand structure includes a vertically aligned central pillar that is not connected to a subsurface and an upper bearing surface for a construction. At least three foot elements are disposed around the central pillar and configured to be connected to the subsurface. Each of the foot elements is connected to at least one upper radial strut and at least one lower radial strut. Each of the struts has a central longitudinal axis, an upper attachment to the central pillar and a lower attachment to a respective one of the foot elements. The central longitudinal axes of each of the upper radial struts has a convexly curved profile beginning at a respective one of the upper attachments. At least one tensile element is disposed so as to compensate buckling forces for each of the upper radial struts.

14 Claims, 6 Drawing Sheets

(52) U.S. Cl.
CPC .... *F05B 2240/9121* (2013.01); *F05B 2240/95* (2013.01); *F05B 2250/711* (2013.01); *Y02E 10/727* (2013.01); *Y02E 10/728* (2013.01)

(56) References Cited

U.S. PATENT DOCUMENTS

| | | | |
|---|---|---|---|
| 6,202,974 B1 * | 3/2001 | Rellinger | 248/460 |
| 6,375,135 B1 * | 4/2002 | Eason et al. | 248/166 |
| 6,450,464 B1 * | 9/2002 | Thomas | 248/168 |
| 6,951,326 B2 * | 10/2005 | Vanover | 248/170 |
| 6,983,916 B2 * | 1/2006 | Raynaud | 248/163.2 |
| 7,240,886 B2 * | 7/2007 | Jones | 248/405 |
| 7,438,266 B2 * | 10/2008 | May | 248/163.1 |
| 7,738,691 B2 * | 6/2010 | Hamm-Dubischar | 382/141 |

FOREIGN PATENT DOCUMENTS

| | | |
|---|---|---|
| DE | 10310708 A1 | 9/2004 |
| DE | 10316405 A1 | 10/2004 |
| DE | 10356682 A1 | 7/2005 |
| EP | 1270848 A1 | 1/2003 |
| EP | 2036813 A1 | 3/2009 |
| EP | 2067915 A2 | 6/2009 |
| EP | 2072685 A1 | 6/2009 |
| GB | 2136860 A | 9/1984 |
| GB | 2309246 A | 7/1997 |
| GB | 2419150 A | 4/2006 |

* cited by examiner

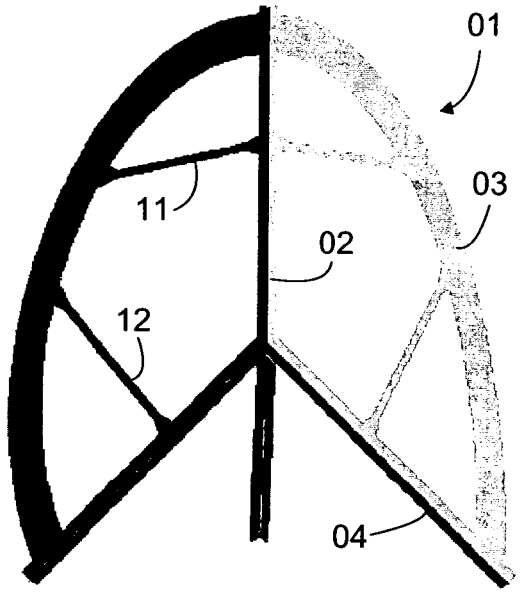
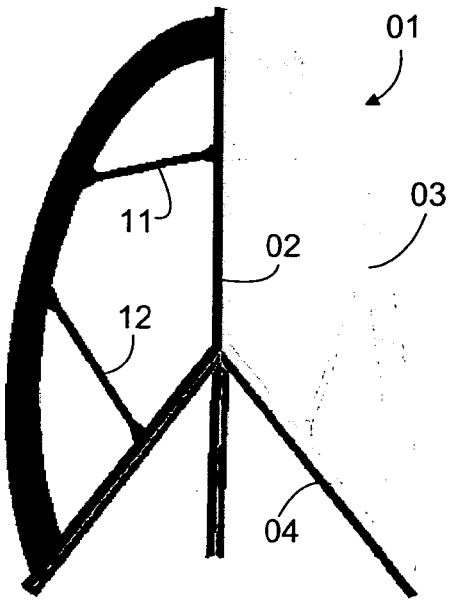
Fig.4A
Fig.4B
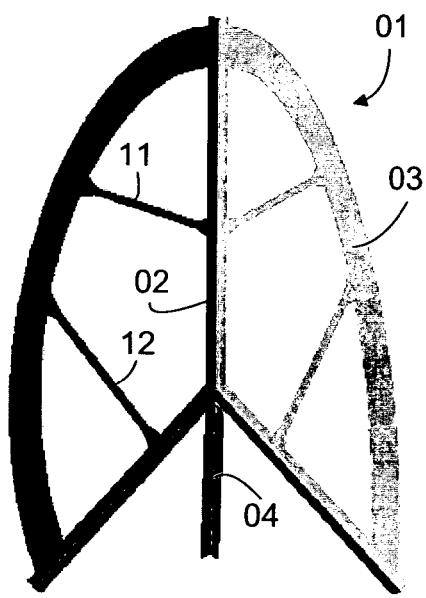
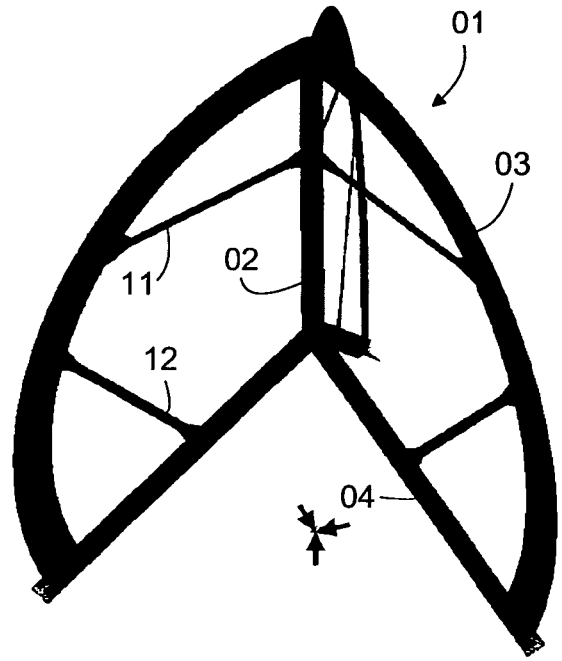
Fig.4C
Fig.4D

STAND STRUCTURE

CROSS-REFERENCE TO PRIOR APPLICATIONS

This application is a U.S. National Phase application under 35 U.S.C. §371 of International Application No. PCT/DE2011/000227, filed on Feb. 25, 2011, and claims benefit to German Patent Application No. DE 10 2010 015 761.9, filed on Apr. 18, 2010. The International Application was published in German on Oct. 27, 2011 as WO 2011/131160 under PCT Article 21(2).

FIELD

The invention relates to a stand structure on a subsurface having a vertically aligned central pillar which is not connected to the subsurface and has an upper bearing surface for a construction, at least three foot elements being connected to the subsurface around the central pillar and, per foot element, to at least one upper radial strut and one lower radial strut having in each case one longitudinal axis, one upper attachment to the central pillar and one lower attachment to the foot element.

BACKGROUND

GB 2 419 150 A discloses a stand structure in framework form, in particular for an offshore wind energy installation, which consists of a vertically aligned central pillar, which however has its substructure on the subsurface, i.e. introduces force into the subsurface. In addition to the weight of the tower and the generator gondola of the offshore wind energy installation, wind and water forces (waves, current, tides) occur, which act on the stand structure. At the same time, three foot elements are founded on a circumferential circle around the central pillar. The weight of the stand structure is therefore introduced into the subsurface both via the central pillar and via the foot elements. For connection to the central pillar, one upper radial strut and one lower radial strut are provided per foot element, the term "radial strut" being derived from its orientation in the direction of the radius of the circumferential circle. The construction of the stand structure is rotationally symmetrical, i.e. all the upper and lower radial struts are attached to the central pillar with their upper attachments in the same radial plane. In each case one upper and one lower radial strut lie in a common axial plane through the respective foot element and are therefore assigned to each other by the foot element. The central longitudinal axes of the known radial struts have a linear profile. The upper radial struts run obliquely, the lower radial struts run horizontally. During loading, high notch stresses are produced in the connection region of the upper radial struts, which run linearly at an acute angle, to the central pillar, which can result in adverse effects. An attachment ring with specially formed transitions should provide help.

EP 2 036 813 B1 discloses a generic stand structure having upper and lower radial struts, from which the invention proceeds as the closest prior art. In contrast to the above-described stand structure, the central pillar in this stand structure is not founded, so all occurring forces are introduced into the floor via the founded foot elements. The rotationally symmetrical construction and the arrangement of upper and lower radial struts per foot element in a common axial plane is identical. The upper radial struts likewise have a linear profile of their central longitudinal axes over their entire length. The upper radial struts in turn run with great inclination and attach to the central pillar at an acute angle. In order to avoid adverse effects on the upper attachment of the upper radial struts to the central pillar owing to occurring notch forces and at the same time to reduce the mass of the stand structure and thus its erection costs, the central pillar and the upper radial struts in this stand structure have a conical profile of their outer contour, with the largest cross section at the upper connection points. The cross sections are correspondingly smaller at points of lower load.

EP 2 072 685 A1 discloses a transition piece between a framework having a multiplicity of straight struts and the tower of a wind energy installation. The outer contour of the transition piece has a slightly curved profile. This acts however to adapt the size of the tower to the framework. The advantage of the transition piece is its division into identical part-pieces in the form of for example quarter shells, which can be connected to each other by simple vertical weld seams during assembly on site. EP 2 067 915 A2 discloses a foot node part for a grating structure for an offshore construction, which as a cast piece allows a curved transition between a substructure pile and the column struts.

DE 103 10 708 A1 discloses a stand structure in the form of a framework having a central pillar and only upper radial struts which run in a straight line and attach to the central pillar at a very acute angle. To stabilise the upper radial struts during transport of the stand structure, stabilisation elements are provided in the upper region of the radial struts, which are each attached to the radial struts and intersect between the radial struts.

EP 1 270 848 A1 discloses a resilient cable brace for water constructions, which is however attached to the outside of the construction and is intended to support the construction against excessive bending under load. DE 103 16 405 A1 also discloses a stand structure in the form of a framework with a cage-like formation, which has a central pillar which is stabilised with rings at different heights instead of radial struts. To this end, the rings are braced upwards and downwards against each other in a spoke-like manner by steel tension cables. One part of the cables is attached to the central pillar and runs obliquely thereto, another part runs between the rings parallel to the central pillar. The central pillar is founded in the subsurface by means of a central foot element and introduces the main forces into the floor.

Finally, DE 35 09 721 A1 discloses a frame structure for mounting a pavilion roof, which for reasons of stability has outwardly curved transverse struts in the profile of its central longitudinal axis. These transverse struts consist of a plurality of pipe sections, which are joined to each other at an obtuse angle, but are horizontally built.

SUMMARY

In an embodiment, the present invention provides a stand structure including a vertically aligned central pillar that is not connected to a subsurface and an upper bearing surface for a construction. At least three foot elements are disposed around the central pillar and configured to be connected to the subsurface. Each of the foot elements is connected to at least one upper radial strut and at least one lower radial strut. Each of the struts has a central longitudinal axis, an upper attachment to the central pillar and a lower attachment to a respective one of the foot elements. The central longitudinal axes of each of the upper radial struts has a convexly curved profile beginning at a respective one of the upper attachments. At least one tensile element is disposed so as to compensate buckling forces for each of the upper radial struts. The at least one tensile element has an outer attachment to a respective one of the upper radial struts and an inner attachment to the central pillar, a respective one of the lower radial struts or an additional upper radial strut disposed above a respective one of the foot elements.

BRIEF DESCRIPTION OF THE DRAWINGS

The stand structure according to the invention is explained in more detail below using the schematic figures, which are not to scale. The claimed stand structure is however not limited to the exemplary embodiments, in particular embodiments having three foot elements and correspondingly three upper and lower radial struts are disclosed. Other embodiments, for example with four, five, six or more foot elements and correspondingly four, five, six or more upper and lower radial struts can however likewise be configured analogously. There is likewise no limitation to a use as a substructure for offshore constructions. The schematically shown designs can in particular be used advantageously in small dimensions as stand structure for electronic devices on the table, shelf and floor area as the subsurface. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 4A . . . D show variants of the stand structure;

DETAILED DESCRIPTION

Figure 1:
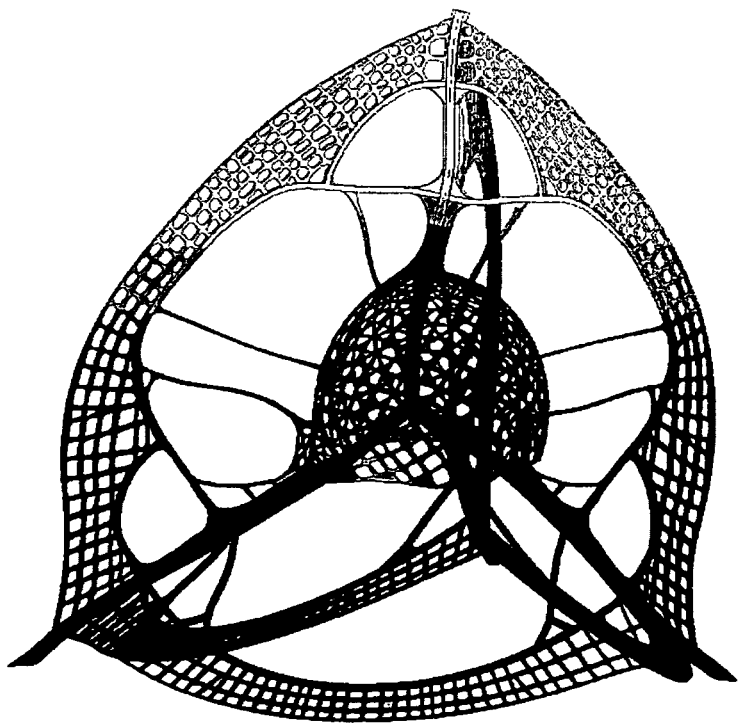
FIG. 1 shows the radiolaria species *Clathrocorys* from the prior art.

Stand structures can bear large and small constructions on their bearing surface, depending on their dimensions. Stand structures for large constructions, for example technical constructions, in the embodiment of substructures, supporting frameworks or mounts are required in various applications, for example for supporting energy installations, for example offshore wind energy installation, substations, for example in the form of mounted transformer stations and cable node points in wind energy farms, storage containers, work platforms, signal devices, cranes, towers or masts. Depending on the application, the large stand structures can be arranged on land or in the water on the water body floor as the subsurface. In the case of arrangement in water, they can be situated completely under water or also project partially (permanently or occasionally) out of the water. Depending on the application, they can also consist of different materials, for example metal, plastic or concrete, used solely or also as a composite material, for example a fibre composite, or a hybrid material, for example a combination of steel with concrete or plastic, and can have greatly differing dimensions, the material and the dimensions being adapted to the prevailing compressive and tensile forces in the stand structure. Stand structures with smaller dimensions can be arranged on a simple solid, flat subsurface, for example consisting of wood, glass or metal, and are known for example in consumer electronics for screens, televisions, computers, loudspeakers and musical instruments.

A main application for the claimed stand structure of large dimensions consists in its use as a substructure for an offshore wind energy installation. In this case the stand structure bears the tower of the wind energy installation with its upper bearing surface. The main portion of electricity generated by renewable energy currently consists of wind energy, at more than 40%. The development of wind power installations is advancing rapidly. Tower heights increase from 30 m to 120 m, the rotor diameters from 15 m to 127 m. At the newly achieved heights with increased wind speeds and enlarged rotors, installations can now provide up to 6 MW generator power. The larger installation are mainly operated as offshore wind energy installations, as there is enough erection space in an uninhabited environment and the wind speeds are even higher off the coast. In offshore areas, however, fundamentally different conditions prevail compared to erection on land; as well as high wind speeds, in particular strong wave forces occur. Adaptations must therefore also be found for the stand structures of offshore wind energy installations in order to be able to withstand the enormous loads. Furthermore, in the case of offshore substructures, the complete dismantling of the installation following its decommissioning must be taken into account when selecting the type of substructure, for environmental reasons. All parts of the installation must be removed to a depth of approx. 2-4 m below the sea floor. The type of substructure of offshore wind energy installations depends greatly on the water depth, the nature of the sea floor and the environmental conditions such as currents, tidal amplitude, waves, ice etc. For water depths up to approx. 30 m, a distinction is drawn between monopiles, gravity and suction pipe substructures, and tripod and frame structures. In the latter case, a plurality of small pipes is rammed into the floor. A spatial framework structure (jacket) consisting of a pipe construction is placed thereon and bears the actual tower of the offshore wind energy installation. The tower connection generally lies below the water surface in order to keep loads from water and where applicable ice low. Tripod and jacket structures have the advantages over monopiles that they can also be used at greater water depths, do not require any preparation of the sea floor and achieve relatively great rigidities and natural vibration frequencies. This is in comparison with the high costs for the use of offshore-suitable steel pipes (mainly corrosion protection) and for the transport and assembly thereof, which are associated inter alia with the great masses and structures used.

An embodiment of the present invention further improves the stability, in particular with regard to effective notch forces, of the stand structure and at the same time further reduces the production costs for the stand structure, in particular on the basis of material use.

The claimed stand structure according to an embodiment of the invention has a profile of the longitudinal axis of the upper radial struts which, beginning at the upper attachment of the upper radial struts to the central pillar, is convexly curved over their entire length. Forces which occur at the upper attachment of the upper radial strut to the central pillar are substantially reduced, as the upper radial struts can absorb forces via their outward curvature. A compensating vertical displacement of the upper attachment of the upper radial struts is then produced. A convexly curved profile means that the longitudinal axis of the central pillar is removed to a maximum distance. In order to reliably prevent the curved upper radial struts from buckling during absorption of force, in the claimed stand structure at least one tensile element is furthermore, according to an embodiment of the invention, arranged for each upper radial strut, which element is attached to the upper radial strut with an outer attachment and to the central pillar or the associated lower radial strut with an inner attachment. The tensile elements are arranged and dimensioned in such a manner that they can reliably compensate any occurring buckling forces in the upper radial struts owing to multi-axis force and moment discharges into the stand structure. A vertical displacement of the upper attachment of the upper radial struts is only allowed to a predefined extent. The stand structure according to an embodiment of the invention furthermore has a substantially wider, more extensive shape in the region of the upper attachment than known stand structures owing to the curved profile of the upper radial struts. The larger enclosed space offers a substantially improved stability to force effects via the tower of the offshore wind energy installation. A large horizontal bearing surface, in which the bearing forces can be well distributed, is produced owing to a virtually horizontal transition between the central pillar and the upper radial struts. This bearing surface can even be situated above the water level in the stand structure according to an embodiment of the invention. The stand structure according to an embodiment of the invention can thus also be built in areas with a large tidal amplitude with an at least temporary exposure. At the same time, the stand structure according to an embodiment of the invention proves a particularly material- and therefore cost-saving lightweight structure of extremely high stability and reliability. Compared to known stand structures in framework form, a saving in materials of up to 50% can be realised with the same loads.

The stability advantages can also be seen in the natural template of the radiolaria species *Clathrocorys*. This radiolarian, which is found as plankton in the sea, is a single-celled, eukaryotic organism with a spherical or cap-shaped endoskeleton consisting of silicon dioxide. Radiolaria have radially projecting cytoplasm extensions, which are supported from inside with thin, rigid spines of silicon dioxide. These emanate in a ray-like manner from an endoskeleton which likewise consists of silicon dioxide and of a spherical, perforated capsule or a plurality of concentrically arranged capsules of this type. The extensions provide suspension in the water and protection from predators. *Clathrocorys* has been selected as particularly suitable for the present invention by the application of a method for determining initial design data for a technical lightweight structure (cf. DE 103 56 682 A1, bionic lightweight structure and optimisation method "Evolutionary Light Structure Engineering" ELiSE), its basic structure has been optimised according to evolutionary strategy, and has then been converted into a technical design (a further usable radiolaria species is *Callimitra*; there are however other microorganisms with great potential as possible templates for a stand or substructure). With this method, a wide variety of geometries can be transferred and adapted from nature to everyday objects of all types and sizes.

The particular stability and light weight with at the same time increased upper spatial extent are produced in the stand structure according to an embodiment of the invention by the convex bending of the upper radial struts from their upper attachment to the central pillar. The upper radial strut recedes from the central pillar first. They can continue to do this as far as their lower attachment so that an open shape of the upper radial struts results. The upper radial strut can however also approach the central pillar again after a maximum distance has been reached, for example in the center or in the region of the center of the central pillar between the upper attachments of the upper radial struts and the upper attachments of the lower radial struts, so that the opening angle of the shape closes again, or after the center can run parallel thereto, so that the opening angle of the shape remains constant. A symmetrical or asymmetrical, convexly curved profile of the central longitudinal axis of the upper radial strut thus results towards the center of the central pillar between the upper attachments of the upper radial struts and the upper attachments of the lower radial struts. It is therefore advantageous in the stand structure according to an embodiment of the invention if the convexly curved profile of the central longitudinal axis of the upper radial struts extends at least to its center. The concrete convexly curved profile of the upper radial struts predefined for use depends on the maximum load and the properties of the design.

Various design parameters can be varied correspondingly likewise depending on the maximum load for the stand structure according to embodiments of the invention. An essential parameter is the radius of the circumferential circle on which the foot elements are arranged. Furthermore, the number and arrangement of the tensile elements on the radial struts and on the central pillar are in particular relevant design parameters as well as the lengths, cross sections and materials of the central pillar, the radial struts and the tensile elements which provide reliable prevention of buckling of the upper radial struts under load in the stand structure according to embodiments of the invention. It is therefore particularly advantageous if at least one upper and one lower tensile element are arranged for each radial strut. The upper tensile element is advantageously arranged with its outer attachment above the center of the upper radial strut and its inner attachment above the center of the central pillar between the upper attachments of the upper radial strut and of the lower radial strut. The lower tensile element is advantageously connected with its outer attachment below the center of the upper radial strut and its inner attachment in the central region of the associated lower radial strut, that is, the radial strut which is attached to the same foot element as the upper radial strut. With only two tensile elements per upper radial strut, a design which is extremely stable to force effects and nevertheless lightweight results.

According to another embodiment of the invention, it can furthermore be advantageously provided for the upper attachment of the lower radial strut to be provided on the central pillar at a height of a third to a half of the height of the upper attachment of the upper radial strut above the subsurface. The lower radial struts also run at a relatively large angle to the central pillar thereby. If there are three lower radial pillars, a tetrahedron forms with a steep point. The relatively large height of the lower attachment of the lower radial struts to the central pillar produces, compared to known stand structures, either a smaller circumferential circle for the foot element or, in the case of longer lower radial struts, greater building freedom beneath the central pillar, so even erections on curved, craggy and rocky or else otherwise occupied subsurfaces can be realised.

With an embodiment of the invention, so many tensile elements must be used individually at such attachment locations with such an inclined profile that any occurring buckling forces are reliably compensated and buckling of the upper radial struts is avoided under all circumstances. In the stand structure according to an embodiment of the invention, more than two tensile elements can thus be provided per radial strut. For example, two upper tensile elements can be provided, which are both attached to the central pillar. Parallel tensile struts can likewise be provided, such as tensile struts with a corresponding inner or outer attachment. Two or more lower tensile elements can also be provided, which are arranged between the upper radial struts and the associated lower radial strut. For further stabilisation of the stand structure, additional horizontal tensile elements with both attachments can also advantageously be provided between the upper radial struts above the center thereof. These horizontal tensile elements not include the central pillar, but stabilise the upper tensile struts against each other. All the tensile elements can also at the same time be distributed over the height of the central pillar between the upper attachments of the upper and lower radial struts and arranged at an angle or horizontally, the attachment locations of the tensile elements to the central pillar and to the upper and lower radial struts being arranged correspondingly depending on the arrangement. In particular the tensile elements can also be arranged asymmetrically depending on the load and erection site of the stand structure.

In an embodiment of the invention, the arrangement of precisely one upper and one lower radial strut in a common axial plane through a foot element has proven advantageous. Furthermore, in the stand structure according to an embodiment of the invention, to further improve its stability according to load and design requirements, more than three upper and/or lower radial struts overall and/or several upper and/or lower radial struts per foot element can advantageously be provided, for example arranged in parallel in each case. For example, a plurality of upper radial struts with a parallel, curved profile then results. In this case it is advantageous if the tensile struts then run with both attachments between the parallel upper radial struts. The stand structure can advantageously also be formed rotationally symmetrically, so production and assembly is made particularly easier. To allow adaptation to a particular subsurface, for example a slope, or to a particular load situation, for example a water or wind current of constant strength in the case of substructures, an asymmetrical construction of the stand structure can advantageously also be provided according to an embodiment of the invention, with different numbers and arrangements of the upper and lower radial struts and tensile elements and the respective attachment thereof.

Furthermore, an adaptation of the stand structure can also be achieved by the formation of the individual components. It is in particular possible for the first time in an embodiment of the invention, and also advantageous, for the upper and/or lower tensile elements and/or horizontal tensile elements to be configured as cables. This is easily possible owing to the prevailing tensile load on the tensile elements during use of the stand structure, which is exerted by the bend loading on the upper radial struts under load. If, after temporary, exceptionally severe deflexion, for example owing to an exceptional wind or wave load, a corresponding restoration of the upper radial struts is produced, the tensile elements can also be compressed temporarily. Cables then become slack, but do not prevent the restoring process. From a certain outward bending of the upper radial struts, the tensile element are however under tension again and reliably prevent buckling of the upper radial struts. The particular advantage in the configuration of the tensile elements as cables, in particular steel cables, consists in the enormous weight saving without safety losses. The transport and assembly of the frame structure is also substantially simplified.

The central pillar can preferably consist of a steel pipe, which is in one or more pieces and has a linear outer contour. The steel pipe can also be welded together from several pieces. Alternatively, the central pillar can also consist of a Y-shaped steel profile. A particularly light weight results with high stability. One upper and one lower radial strut can engage on each wing of the Y-shaped steel profile, so there are three pairs altogether, with three foot elements. The upper radial strut can also preferably consist of a single- or multi-part steel pipe, the central longitudinal axis of which is convexly curved. It is particularly advantageous for the production if at least the upper radial struts are formed from linear or curved steel pipe sections with angled connection regions. A corresponding polyhedral ring section is produced, the central longitudinal axis of which has the convexly curved profile characteristic for an embodiment of the invention. With such a polyhedral formation, it is then furthermore advantageous if the tensile elements are arranged with their outer attachments in the region of the angled connection regions, for example just above or just below. Buckling of the upper radial struts in the connection regions is thereby reliably prevented.

Alternatively, the upper radial strut can also consist of a steel plate, which is rib-shaped and has a large aspect ratio in the direction of the convex curvature, i.e. is much higher than it is broad. This produces additional stabilisation of the stand structure and a reduction in the risk of buckling. However, the structure is also more rigid to the possibility of vertical displacement when under load. Finally, the lower radial strut can also consist of a single- or multi-part steel pipe. Alternatively, the lower radial strut can also consist of a T-shaped steel profile, which counteracts deflexions of the lower radial strut in the direction of the subsurface when under load. The pipe or profile selection for the central pillar and radial struts depends in each case on the load situation. In the case of large offshore wind energy installations, the pipes are preferred, with the exception of the upper radial struts, which can also be configured easily as plates of large size. During selection of the pipes, the central pillar and the radial struts, including the curved upper radial strut, can be conical in order to save materials even further. In this case the configuration is advantageously characterised by a conical profile of the outer contour of the central pillar between the inner attachments of the upper and lower radial strut in the direction of the inner attachment of the lower radial strut and/or by a conical profile of the outer contour of the upper radial strut and/or lower radial strut in the direction of the foot elements. In a conical profile, the cross section becomes continuously smaller.

Further specific details for the stand structure according to embodiments of the invention can be drawn from the specific description section. It should be remarked at this point that details which are not described are known to a person skilled in the art from the prior art. These are for example the type of substructure of the foot elements, for example with foundations or long driven-in pipes, the type of connection of the individual elements in the stand structure to each other, for example in one piece, weld seams, sleeves, bushings, screw fastenings. The tensile elements in the form of steel cables can be fastened to the radial struts and the central pillar for example by eyelets, sleeves or lugs or else wound around them in a loop. The fastening of tensile cables to pillars and struts is sufficiently known for example from bridge construction.

FIG. 1 shows the radiolaria species *Clathrocorys* from the prior art. Four central bar elements can be seen, which run in a tetrahedral manner and are surrounded in the center by a dome. Between all the bar elements run curved bars with a filigree structure. A multiplicity of struts is arranged between the bar elements and the dome. This lightweight structure is ideally suited to absorb even large forces with minimal use of material, owing to an extremely uniform load distribution.

Figure 2:
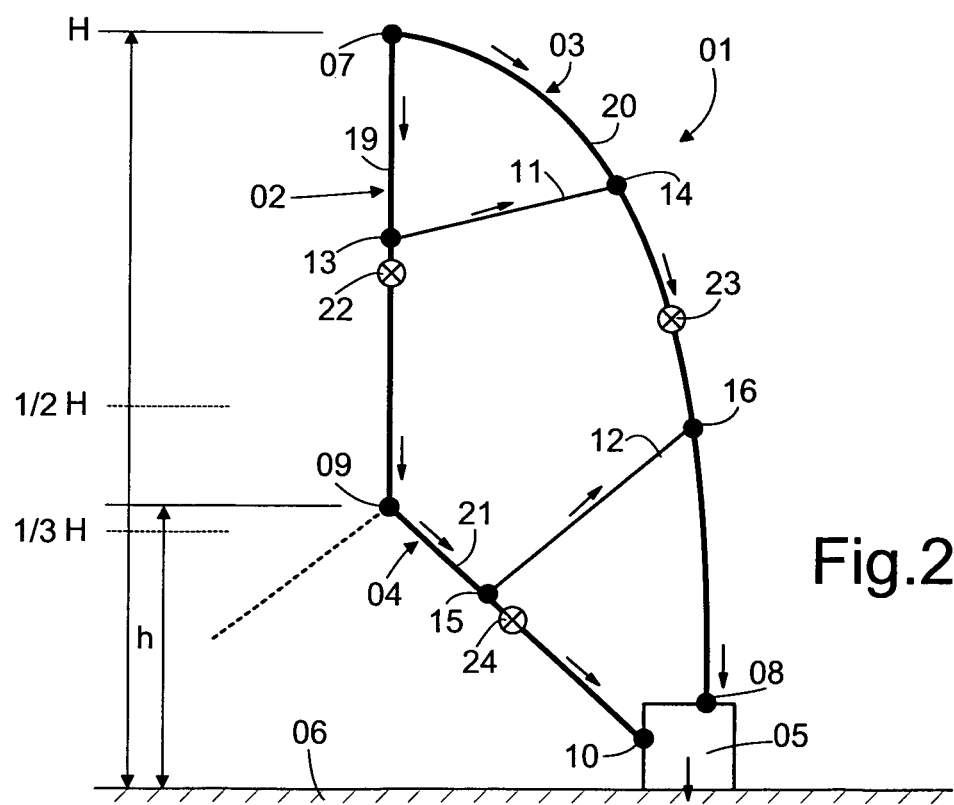
FIG. 2 shows a schematic overview of the stand structure according to an embodiment of the present invention.

FIG. 2 shows a schematic overview of the stand structure 01 in an extract to indicate the basic elements. The figure shows a central pillar 02 having a convexly curved upper radial strut 03, a lower radial strut 04 and a foot element 05 on a subsurface 06. The central pillar 02, the upper radial strut 03 and the lower radial strut 04 are each indicated by their central longitudinal axes 19, 20, 21. The convexly curved profile of the central longitudinal axis 20 of the upper radial strut 03 can easily be seen. The upper radial strut 03 is attached in an upper attachment 07 to the central pillar 02 and in a lower attachment 08 to the foot element 05. The lower radial strut 04 is attached in an upper attachment 09 to the central pillar 02 and in a lower attachment 10 to the foot element 05. Furthermore, an upper tensile element 11 and a lower tensile element 12 are shown. The upper tensile element 11 is attached in an inner attachment 13 to the central pillar 02 and in a outer attachment 14 to the upper radial strut 03. The lower tensile element 12 is attached in an inner attachment 15 to the lower radial strut 04 and in a outer attachment 16 to the upper radial strut 03.

The introduction of force and force profile in the stand structure 01 are indicated by solid arrows in the overview. Possible displacements in the stand structure 01 are indicated by dashed arrows. The center 22 of the central pillar 02 between the upper attachment 07 of the upper radial strut 03 to the central pillar 02 and the upper attachment 09 of the lower radial strut 04 to the central pillar 02, the center 23 of the upper radial strut 03 and the center 24 of the lower radial strut 04 are also indicated. The height H of the upper attachment of the upper radial strut 03 to the central pillar 02 above the subsurface 06 is likewise drawn in. The upper attachment of the lower radial strut 04 to the central pillar 02 lies preferably at a height h in a range of one third to half of height H.

Figure 3A:
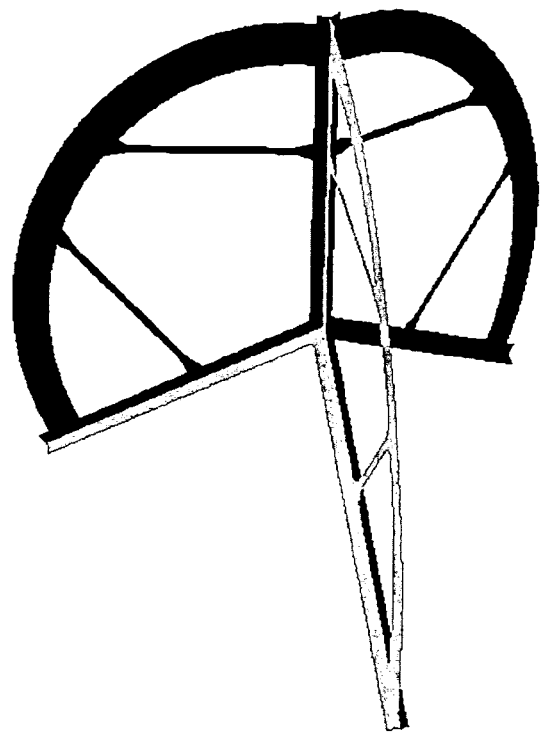
FIGS. 3 A . . . C show a rotationally symmetrical stand structure according to an embodiment of the present invention in three views.
Figure 3B:
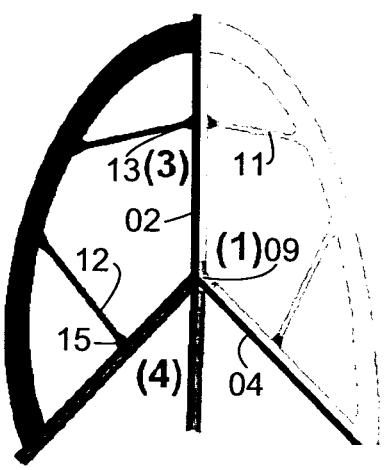
Figure 3C:
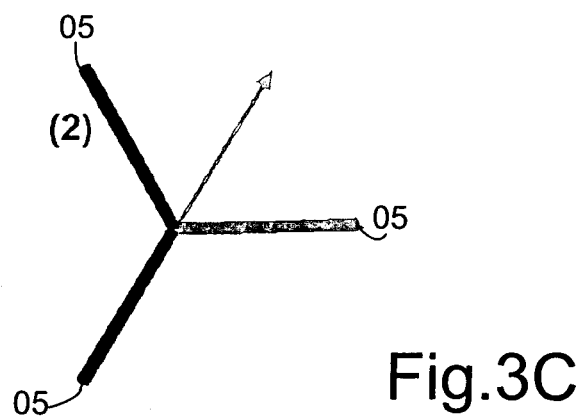

FIGS. 3A, B, C show the design variants of the stand structure according to embodiments of the invention in a rotationally symmetrical framework configuration (FIG. 3A in perspective, FIG. 3B in side view and FIG. 3C in plan view). Possible design parameters (location of the attachment and radius) are shown for a possible design adaptation of the stand structure 01 to the relevant load situation during subsequent use. In this case, (1) is the upper attachment 09 of the lower radial strut 04 to the central pillar 02, (2) is the radius of the circumferential circle on which the foot elements 05 are arranged, (3) is the inner attachment 13 of the upper tensile element 11 to the central pillar 02 and (4) is the inner attachment 15 of the lower tensile element 12 to the lower radial strut 04. FIGS. 4A, B, C, D show possible design variations of the stand structure 01 according to embodiments of the invention in these parameters.

During absorption of the following extreme loads (three translatory, three rotary forces) at a height of 48 m above the subsurface ($F_x$-2024 kN, $F_y$-2483 kN, $F_z$-10130 kN, $M_x$ 160.160 kNm, $M_y$ 148.700 kNm, $M_z$-11.740 kNm) the following positions of the attachments can for example be assumed in the following value ranges:

| Parameter | | Above subsurface | Upper limit | Lower limit |
|---|---|---|---|---|
| Central attachment | (1) | 19.40 m | +3.90 m | −3.90 m |
| Radius of circumferential circle | (2) | 21.70 m | +8.60 m | −4.30 m |
| Upper attachment | (3) | Central between 07 and 09 | +5.60 m | −5.60 m |
| Lower attachment | (4) | Central on 02 | +5.70 m | −5.70 m |
| Material thickness * | | 0.08 m | +0.03 m | −0.03 m |

* offshore-suitable S355 steel (isotropic) with a density $\rho = 7,850$ kg/m$^3$, an e modulus E = 210,000 N/mm$^2$, a Poisson number $y = 0.3$ and a yield strength depending on material strength between 335 and 355 N/mm$^2$.

The central pillar 02 can consist of a steel pipe with a diameter of 1750 mm. The upper and lower radial struts 03, 04 can be configured as steel pipes with a diameter of 1422 mm. The upper radial struts 03 can also be configured as steel plates with a large aspect ratio in the direction of the deflexion, as a result of which additional security is provided against buckling of the convexly curved upper radial struts 03. The same applies if the central pillar 02 and the lower radial struts 04 consist of angled steel, for example Y-shaped (for the central pillar 02) or T-shaped (for the lower radial struts 04). The upper and lower tensile elements 11, 12 can be configured as steel pipes with a diameter of 1321 mm. In total, a weight of between 360 t and 415 t can be calculated for the foundation structure 01. Alternatively, at least the upper tensile elements 11 can also be configured as cables, in particular steel cables, cross section for example 30 mm. A further reduction in weight to a region of only 300 t can thereby be achieved. In the case of a load on the stand structure 01 in a region of 250 t, a vertical displacement of only 100 mm can be calculated for the stand structure 01 (maximum reliably 300 mm).

Figure 5A:
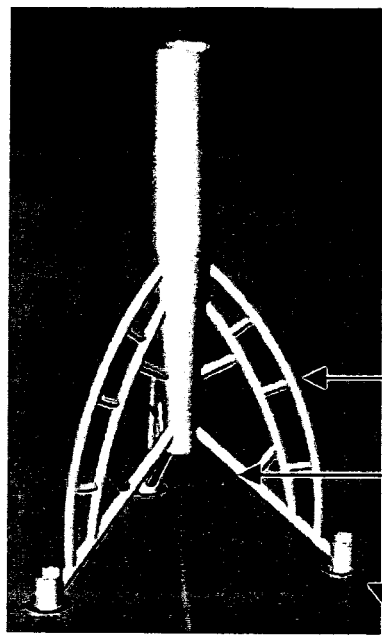
FIGS. 5A . . . E show further designs for the stand structure.
Figure 5B:
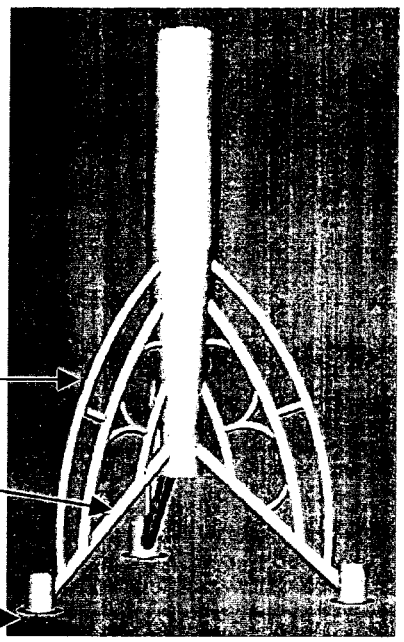
Figure 5C:
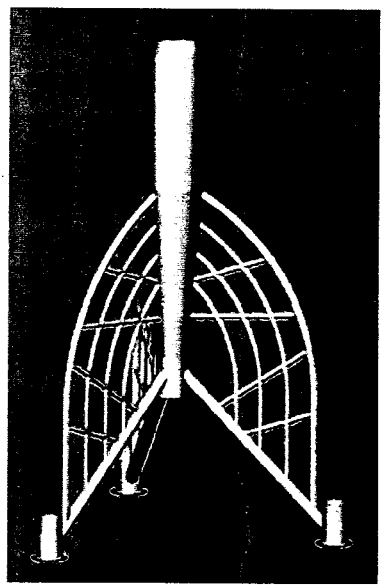

FIGS. 5A . . . E schematically show further possible design configurations of the stand structure 01 according to embodiments of the invention. In this case they are study diagrams. The *Clathrocorys* embodiment described in detail has proven the most favourable variant. The embodiments according to FIGS. 5A, B, D and E are also based on *Clathrocorys*, the embodiment according to FIG. 5C is similar to the radiolaria species *Callimitra*.

Figure 5D:
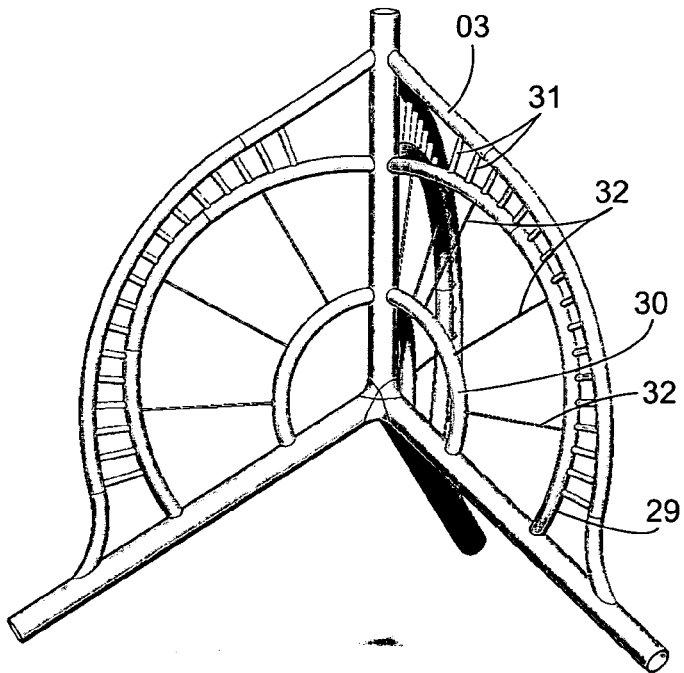
Figure 5E:
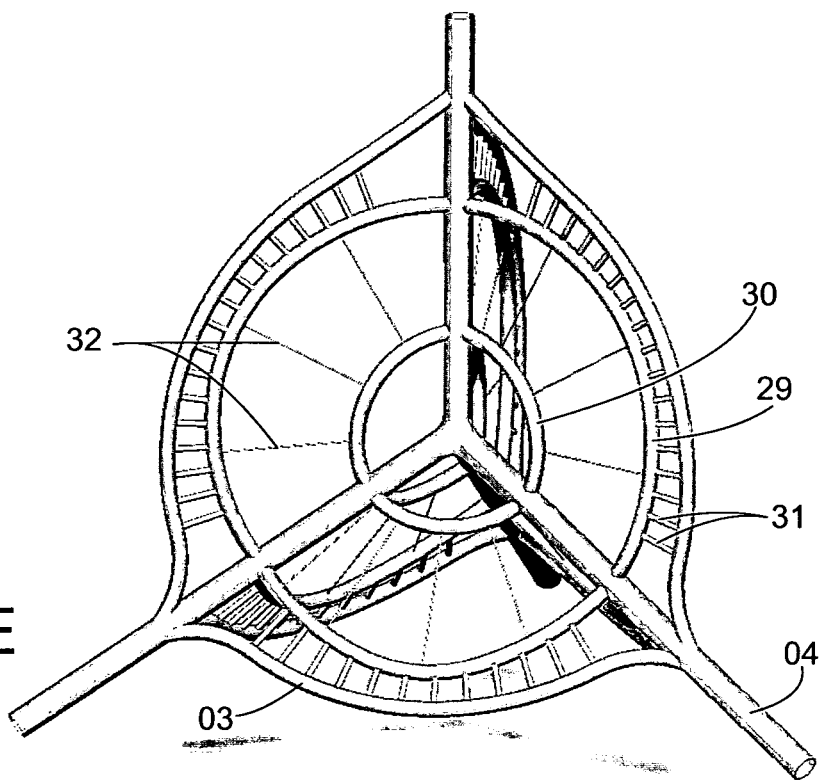

FIG. 5A shows a configuration with in each case two parallel, convexly curved upper radial struts and transverse struts therebetween. FIG. 5B shows a configuration with in each case three parallel, convexly curved upper radial struts and transverse struts therebetween. It can be seen in this embodiment that the tensile elements can also be curved or run or forked. FIG. 5C shows a configuration with in each case four parallel, convexly curved upper radial struts and transverse struts therebetween. FIG. 5D shows a configuration with the convexly curved upper radial strut 03, an additional convexly curved radial strut 29 and an inner radial strut 30, wherein the upper radial strut 03 describes a greater arc radius than the additional upper radial strut 29, which in turn describes a greater arc than the inner radial strut 30. Further short tensile elements 31 can be seen between the upper radial strut 03 and the additional upper radial strut 29 and long tensile elements 32, which can in particular be configured as cables, can be seen between the additional upper radial strut 29 and the inner radial strut 30. As well as the prevention of buckling of the upper radial strut 03 by means of the tensile elements 31, 32 the connection of the radial struts 03, 29, 30 with different arc radii means that a natural stability is achieved, so buckling both outwards and inwards is made more difficult. FIG. 5E shows a configuration according to FIG. 5D with an additional horizontal arrangement of upper radial struts 03, the additional upper radial struts 29 and inner radial struts 30 between the lower radial struts 04. Stabilisation takes place by means of short tensile elements 31 and long tensile elements 32. Such a configuration is constructed symmetrically in all planes and in particular for the additional stabilisation of the lower radial struts 04.

Figure 6:
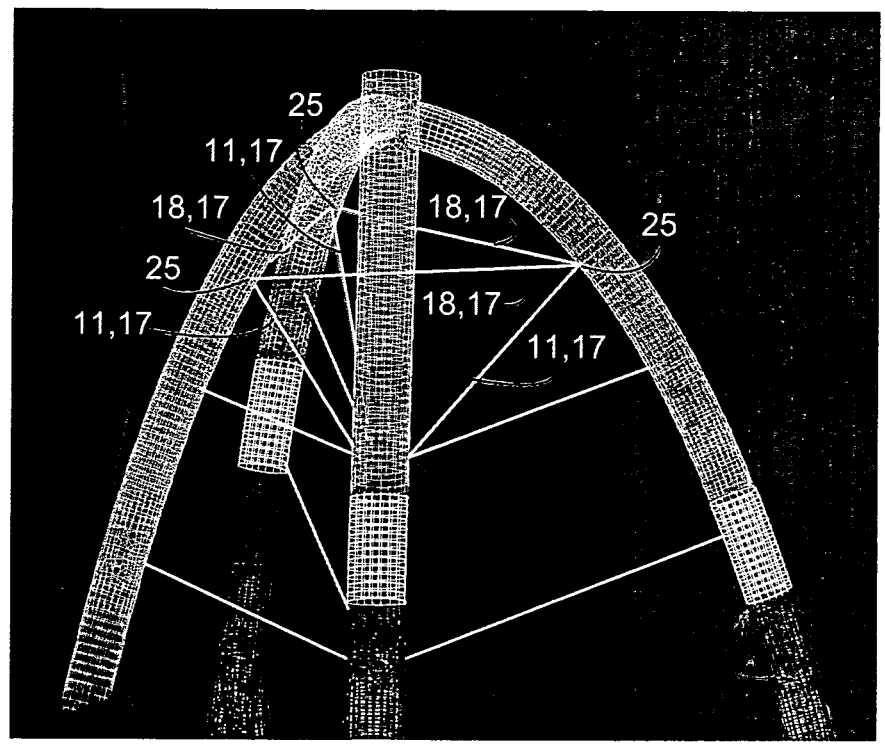
FIG. 6 shows a detail in the upper region of the stand structure.

FIG. 6 shows a detail of the stand structure 01 in the upper region thereof with an arrangement of three upper tensile elements 11 in the form of cables 17 and additional horizontal tensile elements 18, likewise in the configuration of cables 17, which run with their attachments 25 between the upper radial struts 03.

Figure 7:
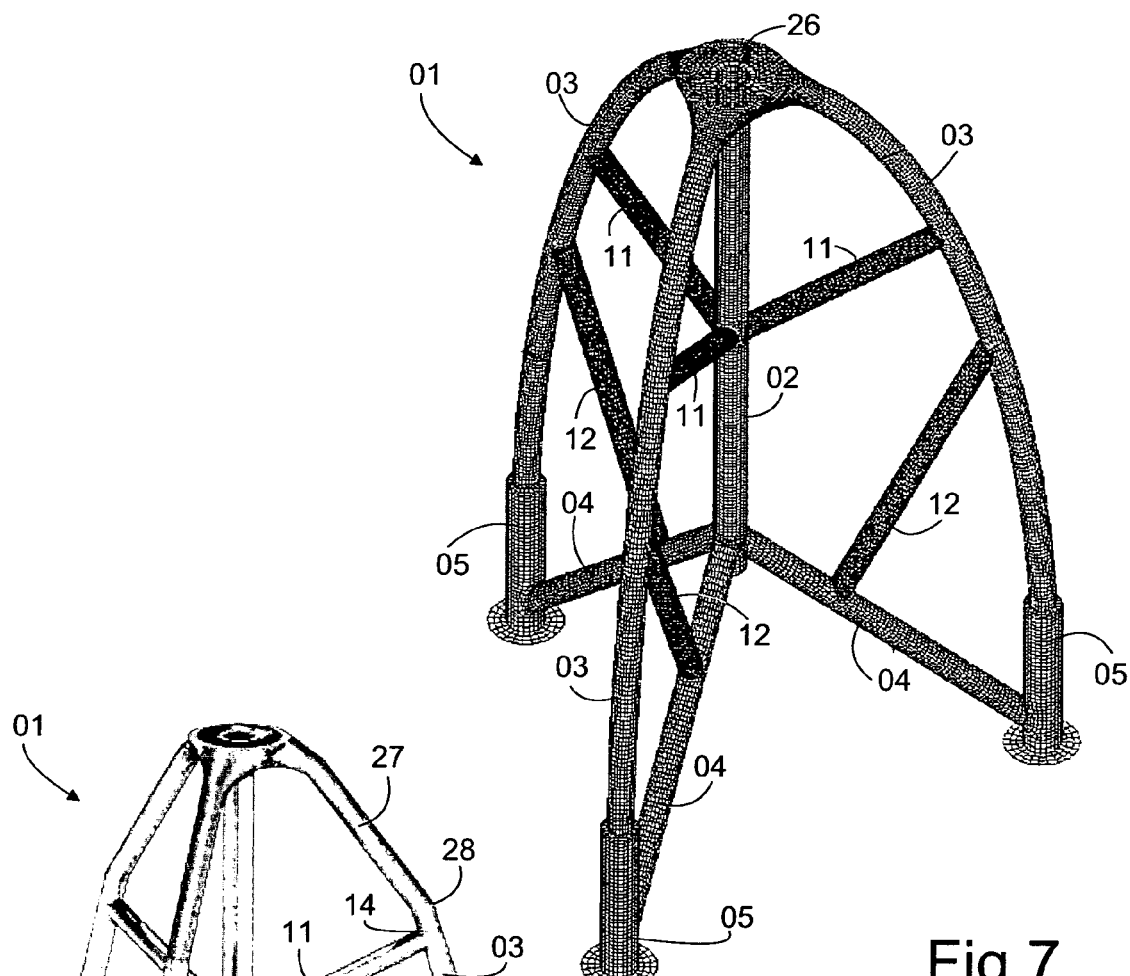
FIG. 7 shows a perspective plan view of the stand structure according to an embodiment of the present invention.

FIG. 7 shows in the perspective plan view the stand structure 01 according to an embodiment of the invention in a rotationally symmetrical design. The central pillar 02 is shown with three lower radial struts 04. From the bearing surface 26, the three convexly curved upper radial struts 03 run to the foot elements 05, which also receive the lower radial struts 04. Also shown are the upper tensile elements 11 and the lower tensile elements 12.

Figure 8:
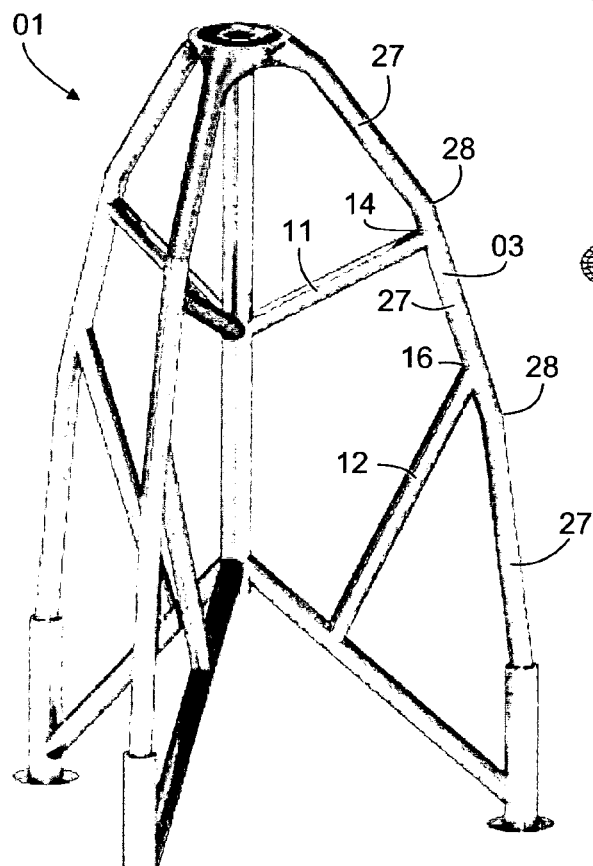
FIG. 8 shows a perspective plan view of the stand structure according to an embodiment of the present invention in polyhedral form with linear pipe sections.

FIG. 8 shows an embodiment of the stand structure 01 according to the invention with a formation of the upper radial struts 03 from linear steel pipe sections 27 with angled connection regions 28. A ring-shaped polyhedral section results. In this case upper and lower tensile elements 11, 12 are arranged with their outer attachments 14, 16 in the region of the angled connection regions 28.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the attached claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B." Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise.

LIST OF REFERENCE SYMBOLS

01 Stand structure
02 Central pillar
03 Convexly curved upper radial strut
04 Lower radial strut
05 Foot element
06 Subsurface
07 Upper attachment of 03 to 02
08 Lower attachment of 03 to 05
09 Upper attachment of 04 to 02
10 Lower attachment of 04 to 05
11 Tensile element, top
12 Tensile element, bottom
13 Inner attachment of 11 to 02
14 Outer attachment of 11 to 03
15 Inner attachment of 12 to 04
16 Outer attachment of 11 to 03
17 Cable
18 Horizontal tensile element
19 Central longitudinal axis of 02
20 Central longitudinal axis of 03
21 Central longitudinal axis of 04
22 Center of 02 between 07 and 09
23 Center of 03
24 Center of 04
25 Attachment of 18 to 03
26 Bearing surface
27 Steel pipe section
28 Angled connection region
29 Additional upper radial strut
30 Inner upper radial strut
31 Short tensile element
32 Long tensile element
H Height of 07 above 06
h Height of 09 above 06

The invention claimed is:

1. A stand structure comprising:
a vertically aligned central pillar that is not connected to a subsurface;
an upper bearing surface for a construction;
at least three foot elements disposed around the central pillar and configured to be connected to the subsurface, each of the foot elements being connected to at least one upper radial strut and at least one lower radial strut, each of the struts having a central longitudinal axis, an upper attachment to the central pillar and a lower attachment to a respective one of the foot elements, the central longitudinal axes of each of the upper radial struts having a convexly curved profile beginning at a respective one of the upper attachments; and
at least one tensile element having an outer attachment to a respective one of the upper radial struts and an inner attachment to one of the central pillar, a respective one of the lower radial struts or an additional upper radial strut disposed above a respective one of the foot elements such that the at least one tensile element is disposed in a manner which compensates buckling forces for the respective one of the upper radial struts.

2. The stand structure according to claim 1, wherein the convexly curved profile extends at least to a center of the central longitudinal axes of the upper radial struts.

3. The stand structure according to claim 1, wherein the at least one tensile element includes at least one upper tensile element and at least one lower tensile element, the at least one upper tensile element having the outer attachment above a center of the respective one of the upper radial struts and the inner attachment above a center of the central pillar between the upper attachment of the respective one of the upper radial struts and the upper attachment of the respective one of the lower radial struts, the at least one lower tensile element having the outer attachment below the center of the respective one of the upper radial struts and the inner attachment in a region of a center of the respective one of the lower radial struts which is attached to a same one of the foot elements as the respective one of the upper radial struts.

4. The stand structure according to claim 1, wherein the upper attachments of the lower radial struts are disposed at a height above the subsurface that is one-third to one-half of a height of the upper attachments of the upper radial struts above the subsurface.

5. The stand structure according to claim 1, further comprising additional horizontal tensile elements each having an attachment at each end to different ones of the upper radial struts above a center of the upper radial struts.

6. The stand structure according to claim 1, wherein each of the foot elements includes a plurality of at least one of the upper radial struts and the lower radial struts.

7. The stand structure according to claim 1, wherein the stand structure has a rotationally symmetrical form.

8. The stand structure according to claim 1, wherein the central longitudinal axes of each of the lower radial struts have a convexly curved profile beginning at a respective one of the upper attachments.

9. The stand structure according to claim 1, wherein at least one of:
the at least one tensile element is formed as a cable;
the central pillar is formed as a single- or multi-part steel pipe or steel profile;

the upper radial struts are each formed as a single- or multi-part steel pipe or steel plate; and the lower radial struts are each formed as a single- or multi-part steel pipe or steel profile.

10. The stand structure according to claim 9, wherein at least one of:

the cable is a steel cable;

the central pillar is formed as a Y-shaped steel profile; and the lower radial struts are each formed as a T-shaped steel profile.

11. The stand structure according to claim 9, wherein the upper radial struts are each formed from linear or curved steel pipe sections with angled connection regions.

12. The stand structure according to claim 9, wherein the outer attachment of the at least one tensile element is in a region of a respective one of the angled connection regions.

13. The stand structure according to claim 1, wherein an outer contour of the central pillar has a conical profile from the upper attachments of the upper radial struts to the upper attachments of the lower radial struts.

14. The stand structure according to claim 1, wherein an outer contour of at least one of the upper radial struts and the lower radial struts has a conical profile from respective ones of the upper attachments to respective ones of the foot elements.

* * * * *